United States Patent
Cho et al.

(10) Patent No.: US 11,445,101 B2
(45) Date of Patent: Sep. 13, 2022

(54) REMOTE CONTROL METHOD AND REMOTE CONTROL SYSTEM USING MOBILE TERMINAL

(71) Applicant: HANWHA TECHWIN CO., LTD., Seongnam-si (KR)

(72) Inventors: Sungbong Cho, Changwon-si (KR); Jeonghun Lee, Changwon-si (KR); Sehyuen Ryu, Changwon-si (KR)

(73) Assignee: Hanwha Techwin Co., Ltd., Seongnam-si (KR)

(*) Notice: Subject to any disclaimer, the term of this patent is extended or adjusted under 35 U.S.C. 154(b) by 1184 days.

(21) Appl. No.: 15/321,840

(22) PCT Filed: Dec. 24, 2014

(86) PCT No.: PCT/KR2014/012750
§ 371 (c)(1),
(2) Date: Dec. 23, 2016

(87) PCT Pub. No.: WO2015/199301
PCT Pub. Date: Dec. 30, 2015

(65) Prior Publication Data
US 2017/0134635 A1     May 11, 2017

(30) Foreign Application Priority Data
Jun. 24, 2014 (KR) .................. 10-2014-0077491

(51) Int. Cl.
*H04N 7/18* (2006.01)
*H04N 5/232* (2006.01)
(Continued)

(52) U.S. Cl.
CPC ......... *H04N 5/23206* (2013.01); *G08C 17/02* (2013.01); *H04N 5/23216* (2013.01);
(Continued)

(58) Field of Classification Search
USPC .................. 386/226, 232, 228, 224, 223
See application file for complete search history.

(56) References Cited

U.S. PATENT DOCUMENTS

| 8,659,400 B2 | 2/2014 | Arling et al. |
| 2008/0309759 A1* | 12/2008 | Wilson ............... G08B 13/1968 |
| | | 348/143 |

(Continued)

FOREIGN PATENT DOCUMENTS

| JP | 2007-013364 | 1/2007 |
| JP | 2007-13364 A | 1/2007 |

(Continued)

OTHER PUBLICATIONS

International Search Report, issued by International Searching Authority in corresponding International Application No. PCT/KR2014/012750, dated Mar. 19, 2015, (PCT/ISA/210).
(Continued)

*Primary Examiner* — Helen Shibru
(74) *Attorney, Agent, or Firm* — McLean IP Global; Jason Y. Pahng

(57) ABSTRACT

The present invention provides a method for remotely controlling an image processing device, using a mobile terminal. The method comprises the steps of: searching for and pairing with an adjacent mobile terminal by an image processing device; receiving screen state information of the image processing device by the paired mobile terminal; generating a menu screen on the basis of the received screen state information by the paired mobile terminal; and receiving an input from a user through the menu screen and controlling a display of the image processing device according to a function of the menu screen selected by the user, by the paired mobile terminal.

16 Claims, 6 Drawing Sheets

(51) Int. Cl.
    *G08C 17/02*     (2006.01)
    *H04W 4/80*     (2018.01)
    *H04W 84/18*     (2009.01)
    *G06F 3/0482*     (2013.01)

(52) U.S. Cl.
    CPC ... *H04N 5/23296* (2013.01); *H04N 5/232935* (2018.08); *H04N 7/181* (2013.01); *H04W 4/80* (2018.02); *G06F 3/0482* (2013.01); *G08C 2201/20* (2013.01); *G08C 2201/93* (2013.01); *H04W 84/18* (2013.01)

(56) References Cited

U.S. PATENT DOCUMENTS

| | | | |
|---|---|---|---|
| 2009/0027555 A1* | 1/2009 | Hanko | H04N 5/4401 348/569 |
| 2012/0044354 A1* | 2/2012 | Cheng | H04N 5/23203 348/159 |
| 2012/0236154 A1 | 9/2012 | Schaff | |
| 2014/0050455 A1* | 2/2014 | Ni | H04N 9/8227 386/224 |
| 2015/0208111 A1* | 7/2015 | Jung | H04N 21/2743 725/92 |
| 2015/0355814 A1* | 12/2015 | Miyamoto | G06F 3/04815 345/173 |
| 2016/0127697 A1* | 5/2016 | Cho | G06F 16/739 348/211.2 |
| 2016/0182862 A1* | 6/2016 | Cho | H04N 7/181 348/143 |

FOREIGN PATENT DOCUMENTS

| | | |
|---|---|---|
| KR | 10-0853959 | 8/2008 |
| KR | 10-0853959 B1 | 8/2008 |
| KR | 10-2011-0098468 A | 9/2011 |
| KR | 10-2012-0084152 A | 7/2012 |
| KR | 10-2012-0098088 A | 9/2012 |
| KR | 10-2012-0084152 | 11/2012 |
| KR | 10-2012-0123954 | 1/2013 |
| KR | 10-2014-0047808 A | 4/2014 |
| KR | 10-2014-0047808 | 5/2014 |

OTHER PUBLICATIONS

PCT/ISA/220, dated Mar. 19, 2015, issued by the International Searching Authority in counterpart International Patent Application No. PCT/KR2014/012750.

Written Opinion, issued by International Searching Authority in corresponding International Application No. PCT/KR2014/012750, dated Mar. 19, 2015, (PCT/ISA/237).

\* cited by examiner

REMOTE CONTROL METHOD AND REMOTE CONTROL SYSTEM USING MOBILE TERMINAL

TECHNICAL FIELD

The present inventive concept relates to a remote control method, and more particularly, to a method of remotely controlling an image processing device.

BACKGROUND ART

Image processing devices including a network video recorder (NVR), a digital video recorder (DVR), and a set-top box support an on-screen display (OSD) or a graphic user interface (GUI).

However, in image processing devices such as a NVR, a DVR, a set-top box, an image output function is much affected by the resolution of a monitor screen. When images are included in software to provide various types of GUI menu screens according to resolutions, the capacity of software executed in an image processing device increases.

To change software executed in the image processing device, a new GUI needs to be developed and an error of a developed GUI needs to be check so that a large amount of a development time is necessary.

DETAILED DESCRIPTION OF THE INVENTIVE CONCEPT

Technical Problem

In the present inventive concept, time and costs required to change software executed in an image processing device are reduced and an image processing device is remotely controlled without having a separate driving apparatus.

Technical Solution

According to an aspect of the present inventive concept, there is provided a remote control system, which includes an at least one source terminal capturing a monitoring image of a particular area, an image processing device assigning a channel number for identifying the monitoring image to each of at least one monitoring image transmitted by the at least one source terminal, and receiving at least one of the at least one monitoring image and displaying a received image on a display, and a mobile terminal receiving screen state information transmitted by the image processing device and generating a menu screen, and receiving an input from a user through the menu screen and controlling the display of the image processing device according to a function of the menu screen received through the menu screen and selected by the user, wherein the menu screen of the mobile terminal is generated based on screen state information including at least one of a screen state of the image processing device, content information output to the display of the image processing device, real-time output state information of a content output to the display of the image processing device, screen split mode information of the image processing device, pan-tilt-zoom (PTZ) support information of the source terminal, audio output state information of the image processing device, time information, and recording state information.

Advantageous Effects

In an embodiment of the present inventive concept, since a remote mobile terminal supports a function to control screen state information of an image processing device, even when a user is not present within a distance adjacent to the image processing device, the image processing device may be conveniently controlled.

BEST MODE

According to another aspect of the present inventive concept, there is provided a method of remotely controlling an image processing device, which includes searching for and pairing with an adjacent mobile terminal, which is performed by an image processing device, receiving screen state information of the image processing device, which is performed by the paired mobile terminal, generating a menu screen on the basis of the received screen state information, which is performed by the paired mobile terminal, and receiving an input from a user through the menu screen and controlling a display of the image processing device according to a function of the menu screen selected by the user, which is performed by the paired mobile terminal.

According to another aspect of the present inventive concept, there is provided a mobile terminal, which includes a receiver receiving screen state information transmitted by an image processing device, a menu screen generator generating a menu screen based on the screen state information, an input portion receiving an input from a user through the menu screen, and a remote controller controlling a display of the image processing device according to a function of the menu screen received through the menu screen and selected by a user, in which the menu screen generator generates the menu screen based on the screen state information including at least one of screen state information of the image processing device, content information output to the display of the image processing device, real-time output state information of a content output to the display of the image processing device, screen split mode information of the image processing device, pan-tilt-zoom (PTZ) support information of a source terminal, audio output state information of the image processing device, time information, and recording state information.

MODE OF THE INVENTIVE CONCEPT

Hereinafter, an embodiment of the present inventive concept is described in detail with reference to the accompanying drawings.

Figure 1:
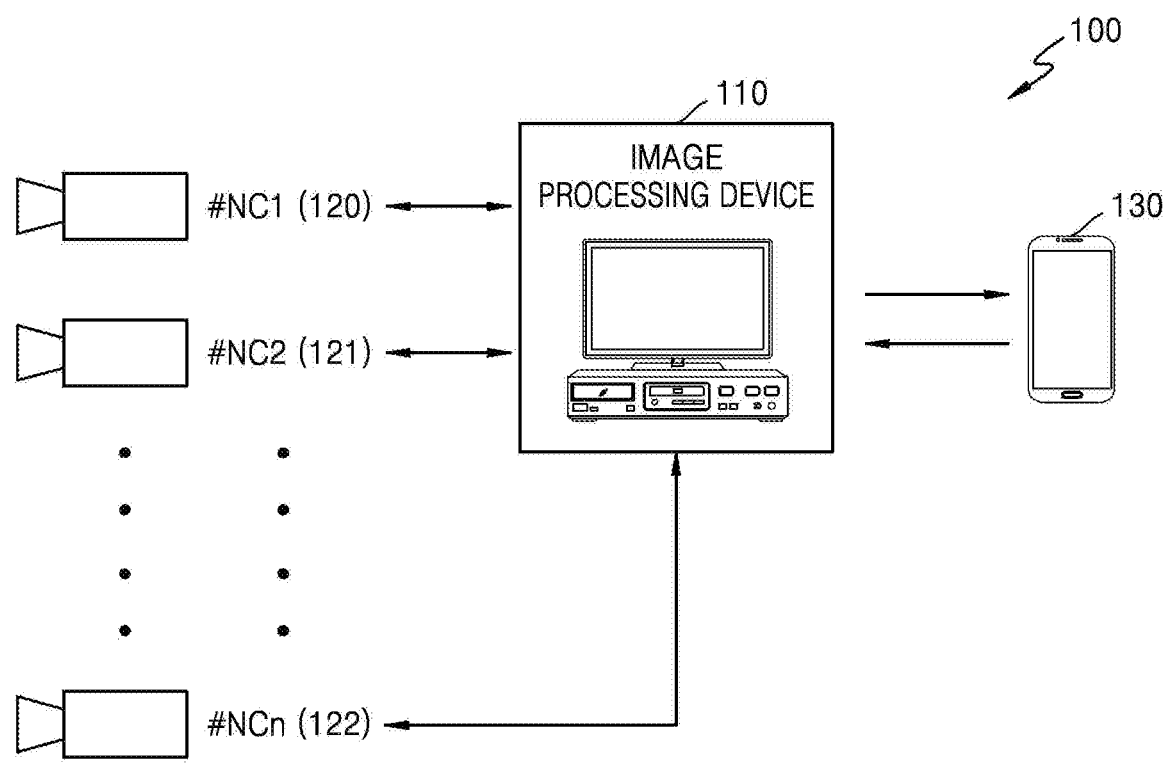
FIG. 1 is a system diagram of a remote control system, according to an embodiment.

FIG. 1 is a system diagram of a remote control system, according to an embodiment.

A remote control system 100 may include at least one of source terminals 120, 121, and 122, an image processing device 110, and a mobile terminal 130.

At least one of the source terminals 120, 121, and 122 monitors a particular area, captures an image of the area, and transmits the image to the image processing device 110. Each of the source terminals 120, 121, and 122 includes a terminal for transferring an input through text or creating a content. The created content is transmitted to the image processing device 110.

The image processing device 110 and the at least one of the source terminals 120, 121, and 122 may communicate with each other by wires or wirelessly. Examples of wireless communications may include Wi-Fi, wireless broadband Internet (WiBro), high speed downlink packet access (HSDPA), world interoperability for microwave access (WIMAX), Zigbee, and Bluetooth.

Examples of the image processing device 110 may include a network video recorder (NVR), a digital video recorder (DVR), a set-top box, a personal computer, a digital television, a media projector, a handheld device, and a consumer electronics device.

Examples of the source terminals 120, 121, and 122 may include a network camera, a mobile phone, a camera, and a smartphone, and also include all thin terminals supporting processing and replaying of multimedia.

The image processing device 110 receives an image or content transmitted by the at least one of the source terminals 120, 121, and 122. The content may include all of audio, video, and text. The image processing device 110 may assign an identification number to identify each of one or more images or contents transmitted by the source terminals 120, 121, and 122. For example, an identification number of a first channel may be assigned to an image transmitted by the first network camera 120, and an identification number of a second channel may be assigned to an image transmitted by the second network camera 121.

The image processing device 110 may include at least one of the received images or contents in the image processing device 110 or display the at least one of the received images or contents by performing a display function through wired or wireless communication with the image processing device 110.

Figure 2:
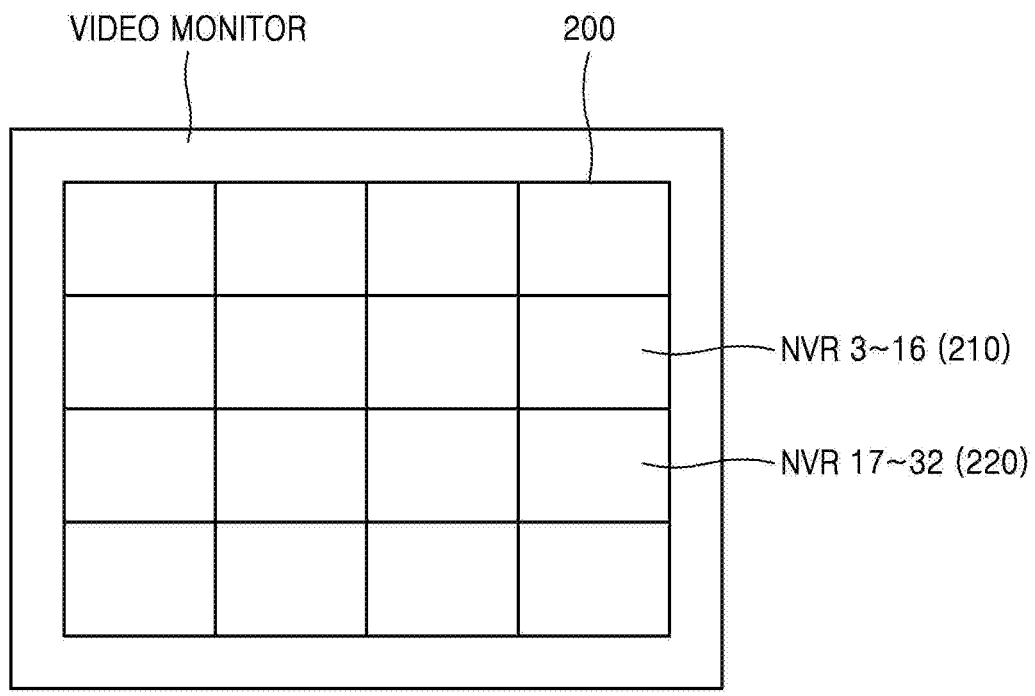
FIGS. 2 and 3 illustrate examples of a display of an image processing device, according to embodiments.
Figure 3:
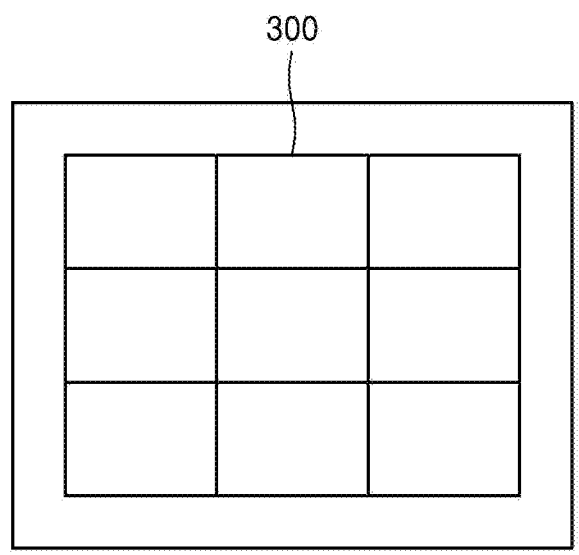

To this end, the image processing device 110 supports a screen split function. FIG. 2 illustrates an example in which the image processing device 110 provides a screen split into sixteen areas. FIG. 3 illustrates an example in which the image processing device 110 provides a screen split into nine areas. The image processing device 110 may be embodied to display all contents received from the at least one of the source terminals 120, 121, and 122 on a display, or only one content provided by a particular one of the at least one of the source terminals 120, 121, and 122 on the display.

The image processing device 110 may display the images or contents received from the source terminals 120, 121, and 122 on the split areas of a screen 200 of FIG. 2 or 300 of FIG. 3. For example, images transmitted by the third NVR source terminal to the sixteenth NVR source terminal may be displayed in one area 210 of the split screen. Furthermore, images transmitted by the seventeenth NVR source terminal to the thirty-second NVR source terminal may be displayed in another area 220 of the split screen.

The image processing device 110 may be embodied to transmit screen state information about the content received from the at least one of the source terminals 120, 121, and 122 to the mobile terminal 130.

The image processing device 110 may perform a pairing process to discover the mobile terminal 130 located nearby and to perform an authentication process using, for example, Wi-Wi-Fi Direct, or Bluetooth. When the pairing between the image processing device 110 and the mobile terminal 130 is disconnected, the state of the mobile terminal 130 is changed to locked. While the pairing is established, the mobile terminal 130 may log in as a registered user. The pairing process may further include a user authentication process.

When the pairing is performed, the image processing device 110 transmits the screen state information indicating state information of a current screen to the mobile terminal 130. The mobile terminal 130 receives the screen state information transmitted by the image processing device 110 and generates a menu screen that provides an interface to control the image processing device 110.

The screen state information may include state information of the image processing device 110, operation information of the image processing device 110, and setting information of the image processing device 110.

An example of the state information of the image processing device 110 may include Live, Playback, Split View, or Channel. Live indicates that the image processing device 110 displays in real time the image or content received from the adjacent source terminals 120, 121, and 122. Playback indicates that the image processing device 110 replays a recorded image received from the adjacent source terminals 120, 121, and 122. Split View indicates that the display of the image processing device 110 is split to display a plurality of images. Channel indicates information about the adjacent source terminals 120, 121, and 122 that provide the image or content selected by the image processing device 110.

Examples of the operation information of the image processing device 110 and the setting information of the image processing device 110 may include state information of a screen output channel, image profile information, time information, pan-tilt-zoom (PTZ) information, recording state information, audio output state information of the image processing device 110, usable menu information.

The state information of a screen output channel may include Video Loss, Disconnect, Connect, Video, Freeze, Play, Pause, and Speed. The image profile information may include Resolution, Frame rate, Bit rate, Codec, and Quality. The PTZ information may include information on whether or not the PTZ (pan, tilt, and zoom) control of the source terminals can be performed and information about an area in a display where PTZ is performed. The recording state information may include Full Frame Recording, I-Frame Filter Rec, Stop, and Disk Full Stop.

An example of the menu screen is described with reference to FIG. 4. According to an embodiment, the mobile terminal 130 may generate the menu screen of FIG. 4 based on the received screen state information. In this case, the menu screen may be implemented on a display of a mobile terminal in the form of an on-screen display (OSD) or a graphic user interface (GUI).

In an embodiment, when the mobile terminal 130 receives screen state information, an alarm or a message indicating that the screen state information is received pops up on the mobile terminal 130 and a guide message asking a user whether to perform an application may be displayed. In other words, this may be implemented in the form of an application or WEB in the mobile terminal 130.

Figure 4:
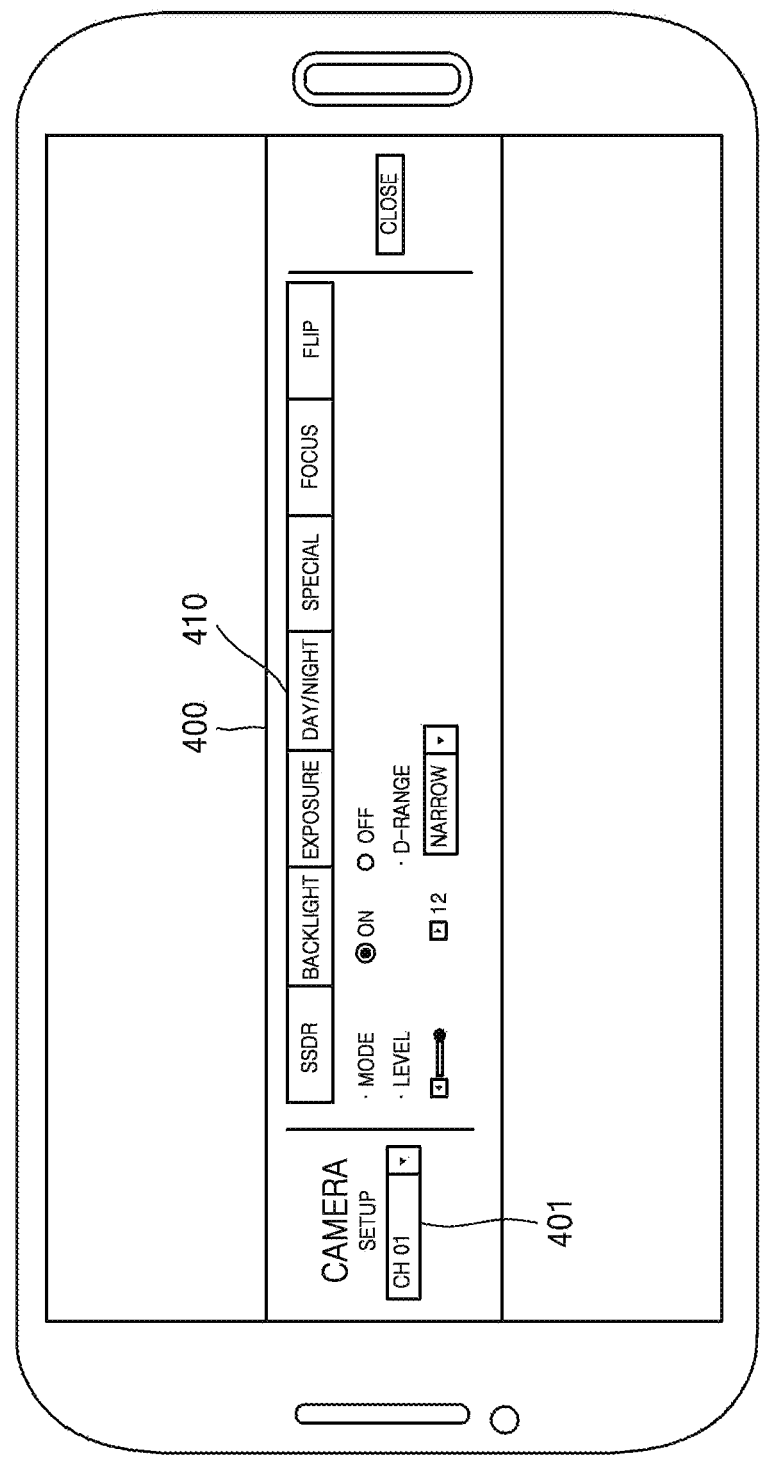
FIG. 4 illustrates an example of a menu screen implemented in a mobile terminal, according to an embodiment.

FIG. 4 illustrates an example of a menu screen 400 according to an embodiment. A user may select each function displayed on the menu screen 400. In an example, when the user wants to adjust brightness of Channel 1, the channel may be selected (401) and a menu mode to adjust brightness may be selected (410).

A user input received through the menu screen 400 of the mobile terminal 130 is transferred to the image processing device 110 through the mobile terminal 130. In an example, when the user adjusts the brightness of Channel 1 to be brighter by two levels through the menu screen 400 of the mobile terminal 130, the brightness of Channel 1 reproduced in the image processing device 110 is adjusted to be brighter by two levels.

In other words, it is possible for a user to control the image displayed on the image processing device 110 according to a function selected by the user through the menu screen 400. For example, the user may change a screen split mode of the display of the image processing device 110, control application of PTZ, change the position of an image output channel, or control an audio output function through the menu screen 400.

Furthermore, since an interface of asking a user to input a password through the menu screen 400 is supported, the image displayed on the image processing device 110 may be displayed only for the user having an appropriate right.

According to another embodiment, in an example of a NVR image processing device, when power of a NVR system is connected and the NVR system begins, basic system setting may be required, for example, setting language, date, time, network, and login ID/PWD needed for an installation environment. In this case, when the NVR image processing device searches for an adjacent mobile terminal and performs an authentication process, forming pairing, a network camera connected to the NVR image processing device may be searched for through the menu screen of a mobile terminal and a search result may be received on the mobile terminal 130.

Then, in the mobile terminal 130, a particular network camera is selected among the network cameras connected to the NVR image processing device, and when a preview of the network camera is to be watched and an image is requested through the menu screen 400 implemented by the mobile terminal 130, in the image processing device 110, the image may be received from the network camera and transferred to the mobile terminal 130 or may be output directly to the display of the image processing device 110.

Accordingly, in the process of performing a setting job in the image processing device 110, a function of monitoring an image by using the mobile terminal 130 may be implemented.

In another embodiment, when the image processing device 110 outputs a real-time image, the screen split mode of an image currently output through the mobile terminal 130 may be changed from nine split areas to twelve split areas or from two split areas to a single area.

According to an embodiment, the menu screen 400 implemented on the mobile terminal 130 is adaptively generated according to the screen state information transmitted by the image processing device 110 and generated by using the state information of a currently output image. Accordingly, the menu screen 400 implemented on the mobile terminal 130 is independently operated from a menu screen 510 of FIG. 5 generated by the image processing device 110.

According to an embodiment, the menu screen 400 may further include a function to add a user input through the mobile terminal 130.

For example, a user may add a user input function to the menu screen 400 so that the user adds text input through a keyboard or a keypad of the mobile terminal 130, an image captured by the mobile terminal 130, and audio text recorded by the mobile terminal 130 to an image or content displayed on the image processing device 110.

Furthermore, when the above information is input by using a keypad of the mobile terminal 130, the image or content displayed on the image processing device 110 may be efficiently controlled remotely by using a multi-touch or sensor function supported by the mobile terminal 130.

In another embodiment, the image processing device 110 may mirror a current screen to the mobile terminal 130. In addition, the image processing device 110 may transmit the content received from the at least one of the source terminals 120, 121, and 122 to the mobile terminal 130.

Figure 5:
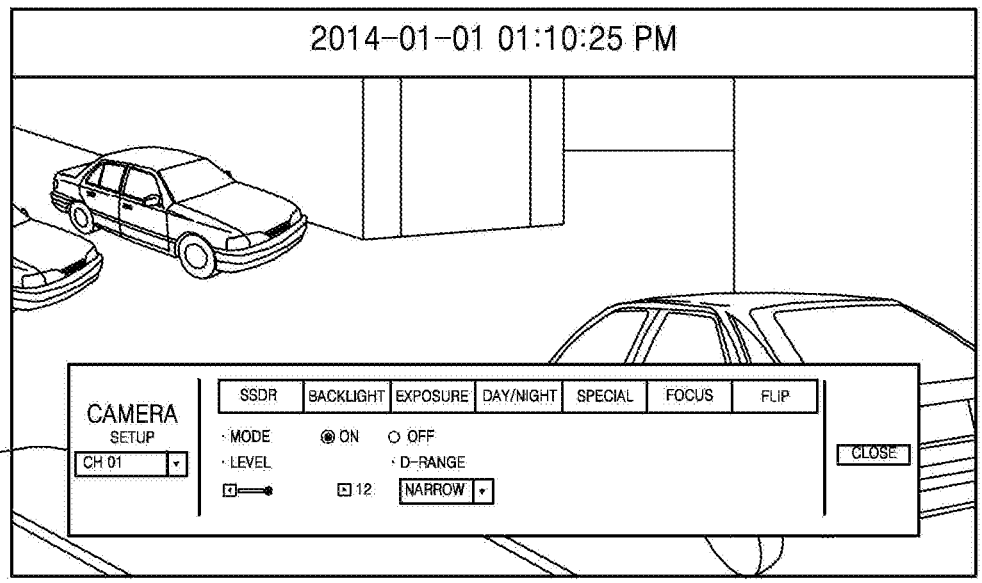
FIGS. 5 and 6 illustrate examples of displays of an image processing device, according to an embodiment.
Figure 6:
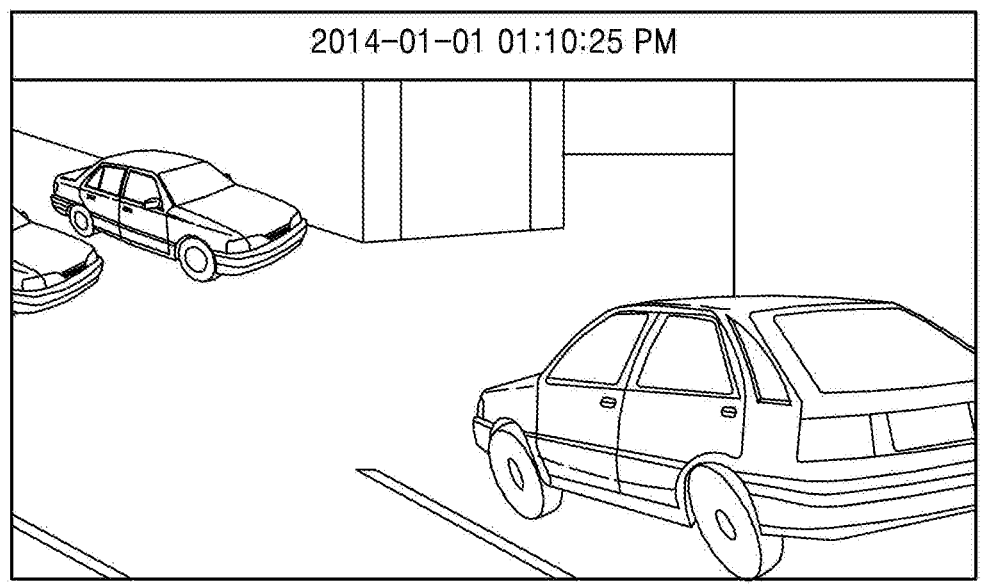

FIGS. 5 and 6 illustrate displays of the image processing device 110, according to an embodiment.

In an embodiment, as illustrated in FIG. 5, a menu screen for controlling a display of the image processing device 110 is pop up on the display of the image processing device 110.

In this case, however, it is inconvenient that a part of an image is covered by the menu screen and the user needs to directly control the image processing device 110 from a distance close to the image processing device 110.

In an embodiment, when only an image is displayed on the image processing device 110 as illustrated in FIG. 6, the menu screen to control the image is generated on the mobile terminal 130 as illustrated in FIG. 4 and thus an interface of controlling the image processing device 110 from a distance away from the image processing device 110 is supported.

In an embodiment, in the state in which the menu screen for controlling the image processing device 110 is pop up on the image processing device 110 as illustrated in FIG. 5, the menu screen may be simultaneously generated on the mobile terminal 130 as illustrated in FIG. 4. However, in an embodiment, the menu screen generated on the mobile terminal 130 is independently generated from the menu screen generated on the image processing device 110.

Figure 7:
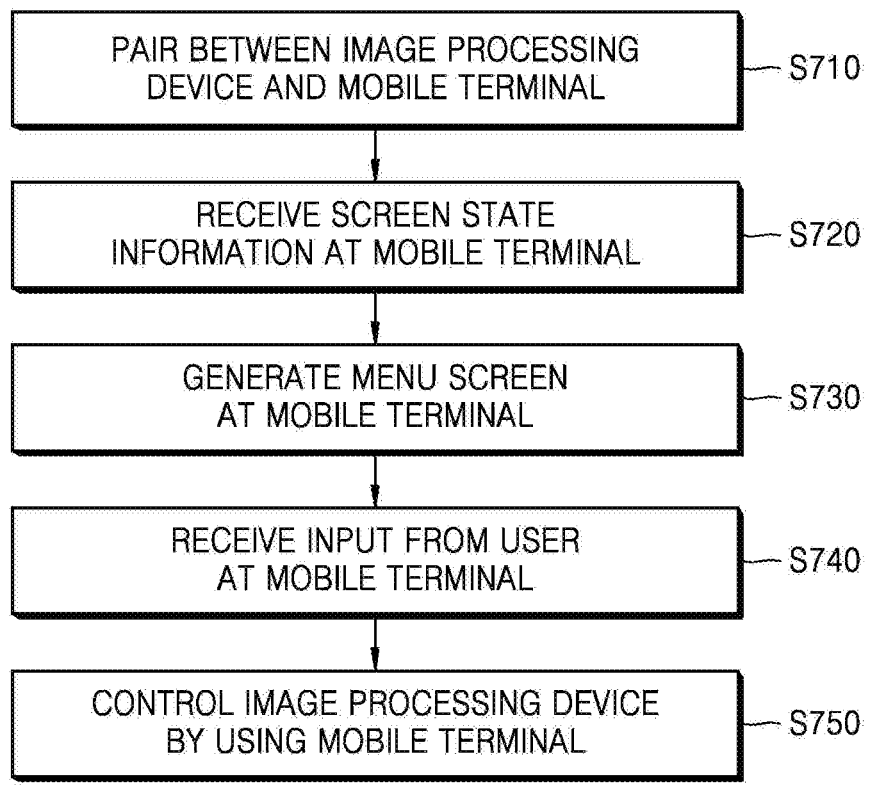
FIGS. 7 and 8 are flowcharts of controlling an image processing device by using a mobile terminal in a remote control system including at least one of the source terminals, an image processing device, the mobile terminal, according to an embodiment.
Figure 8:
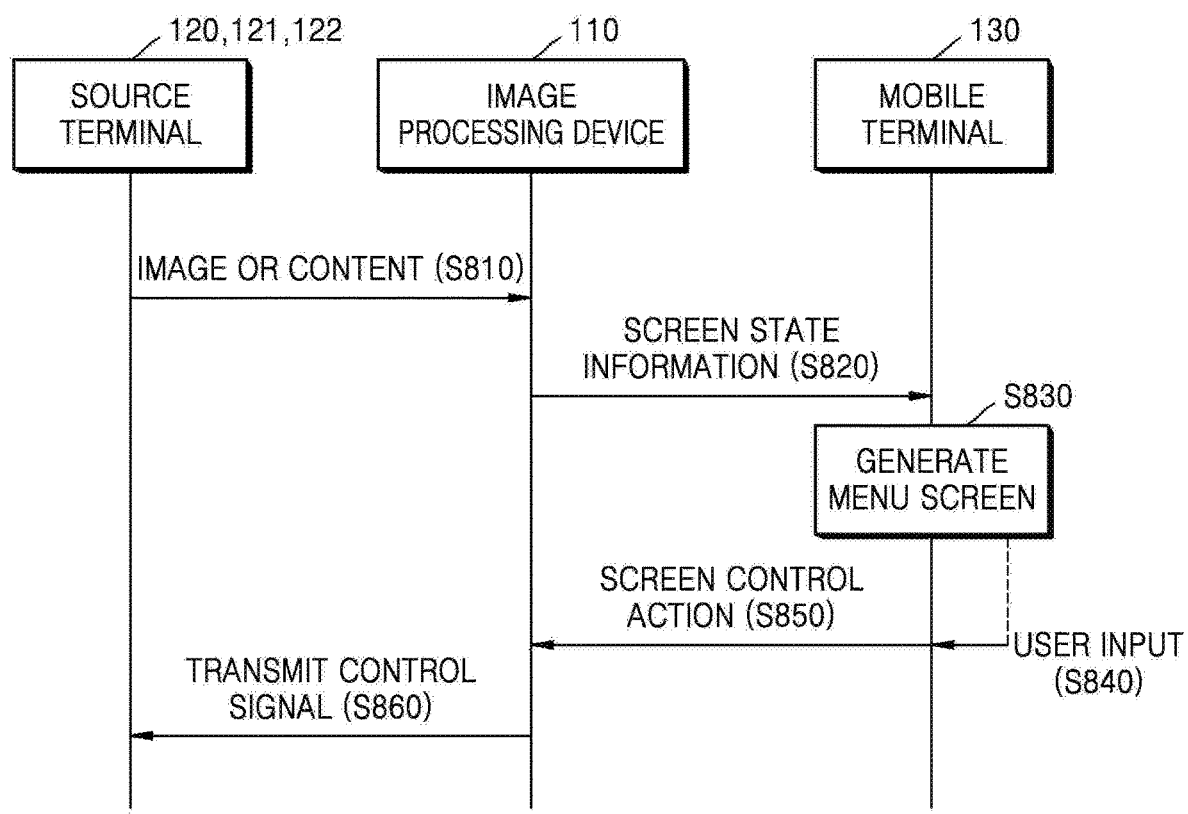

FIGS. 7 and 8 are flowcharts of a method of controlling the image processing device 110 by using the mobile terminal 130 in the remote control system 100 including the at least one of the source terminals 120, 121, and 122, the image processing device 110, the mobile terminal 130, according to an embodiment. The method is described below with reference to FIGS. 7 and 8.

The image processing device 110 receives an image or content from the at least one of the source terminals 120, 121, and 122 located nearby (S810). The image processing device 110 performs pairing after searching for and approving the mobile terminal 130 (S710).

When pairing is established, the image processing device 110 transmits screen state information (S820) of the image processing device 110 to the mobile terminal 130 (S720). The mobile terminal 130 generates the menu screen as illustrated in FIG. 4 based on the received screen state information (S820) (S730 and S830).

Next, the mobile terminal 130 receives a user input through the menu screen (S740, S840). When a user wants to control the image processing device 110, the user performs a desired function by using the menu screen of the mobile terminal 130. When the user inputs an action (S850) to control a display through the menu screen of the mobile terminal 130, the mobile terminal 130 transmits a signal to control the display to the image processing device 110.

The image processing device 110 controls the image or content displayed on the display of the image processing device 110 according to the screen control signal received from the mobile terminal 130 (S750, S850). In this case, for example, for an action such as panning, tilting, and zooming that requires additional control of the source terminals 120, 121, and 122, the image processing device 110 transmits an appropriate control signal to the source terminals 120, 121, and 122 (S860).

The inventive concept can also be embodied as computer readable codes on a computer readable recording medium. The computer readable recording medium is any data storage device that can store programs or data which can be thereafter read by a computer system.

Examples of the computer readable recording medium include read-only memory (ROM), random-access memory (RAM), CD-ROMs, magnetic tapes, floppy disks, optical data storage devices, and so on. The computer readable recording medium can also be distributed over network coupled computer systems so that the computer readable code is stored and executed in a distributive manner.

While this inventive concept has been particularly shown and described with reference to embodiments thereof, it will be understood by those skilled in the art that various changes in form and details may be made therein without departing from the spirit and scope of the inventive concept as defined by the appended claims.

The embodiments should be considered in descriptive sense only and not for purposes of limitation. Therefore, the scope of the inventive concept is defined not by the detailed description of the inventive concept but by the appended claims, and all differences within the scope will be construed as being included in the present inventive concept.

The invention claimed is:

1. A remote control system comprising:
    an at least one source terminal capturing a monitoring image of a particular area;
    an image processing device assigning a channel number for identifying the monitoring image to each of at least one monitoring image transmitted by the at least one source terminal, and receiving at least one of the at least one monitoring image and displaying a received image on a display; and
    a mobile terminal receiving screen state information transmitted by the image processing device, and the mobile terminal generating a menu screen based on the received screen state information, and the mobile terminal receiving an input from a user through the menu screen and controlling the display of the image processing device according to a function of the menu screen received through the menu screen and selected by the user,
    wherein the menu screen of the mobile terminal is generated based on the screen state information, and the screen state information includes at least one of a screen state of the image processing device, content information output to the display of the image processing device, real-time output state information of a content output to the display of the image processing device, screen split mode information of the image processing device, pan-tilt-zoom (PTZ) support information of the source terminal, audio output state information of the image processing device, time information, and recording state information; and
    wherein the mobile terminal receives an input signal through a PTZ control menu; and transmits, to the image processing device, a signal for a PTZ control action of the source terminal based on the input signal so that at least one of panning action, tilting action and zooming action is to be applied to the source terminal according to the signal.

2. The remote control system of claim 1, wherein the menu screen of the mobile terminal is generated on the display of the mobile terminal in a form of an on-screen display (OSD) or a graphic user interface (GUI).

3. The remote control system of claim 1, wherein the image processing device and the mobile terminal are paired with each other by a Wi-Fi direct communication or a Bluetooth communication.

4. The remote control system of claim 1, wherein, when there is a split screen asking an input of a password among split screens of the image processing device, the password is input through the mobile terminal.

5. A method of remotely controlling an image processing device, the method comprising:
    searching for and pairing with a mobile terminal, which is performed by an image processing device;
    receiving screen state information of the image processing device, which is performed by the paired mobile terminal, wherein the screen state information includes pan-tilt-zoom support information that includes information on whether pan, tilt, and zoom are possible and information about an area in a display where PTZ is performed;
    generating a menu screen on the basis of the received screen state information, which is performed by the paired mobile terminal; and
    receiving an input from a user through the menu screen and controlling a display of the image processing device according to a function of the menu screen selected by the user, which is performed by the paired mobile terminal.

6. The method of claim 5, wherein the image processing device receives an input of a content from at least one of source terminals and displays the content on a display supported by the image processing device or a display communicated with the image processing device by wires or wirelessly, and
    when the content is plural, at least one of the contents is selected and displayed on the display.

7. The method of claim 6, wherein the screen state information comprises at least one of content information output to the display, real-time output state information of a content output to the display, screen split mode information, pan-tilt-zoom (PTZ) support information of the source terminal, and audio output state information of the image processing device.

8. The method of claim 6, wherein the screen state information comprises at least one of replay image information output to the display, real-time output state information of a content output to the display, information about a channel of the source terminal transmitted an image output on the display, screen split mode information, and pan-tilt-zoom (PTZ) support information of the source terminal.

9. The method of claim 6, wherein the menu screen is generated in a form of an on-screen display (OSD) or a graphic user interface (GUI) on the display of the paired mobile terminal.

10. The method of claim 5, wherein the paired mobile terminal receives an input from a user through the menu screen and controls the display of the image processing device according to a function of the menu screen selected by the user, and
    the menu screen supports at least one of a pan-tilt-zoom (PTZ) control mode, a screen split mode, an audio output mode, a content output position change mode, and a user input mode.

11. The method of claim 10, wherein, when the user selects the user input mode through the menu screen, an input that is input through the paired mobile terminal is input to the image processing device and the input includes at least one of text, voice, and an image.

12. The method of claim 10, wherein, when the user selects the PTZ control mode through the menu screen, the paired mobile terminal perform a PTZ control on part of or whole of a screen of the image processing device display.

13. The method of claim 5, wherein the image processing device performs searching for and paring with an adjacent mobile terminal on the mobile terminal by using a Wi-Fi communication or Bluetooth communication.

14. A mobile terminal comprising:
- a receiver receiving screen state information transmitted by an image processing device;
- a menu screen generator generating a menu screen based on the screen state information;
- an input portion receiving an input from a user through the menu screen; and
- a remote controller controlling a display of the image processing device according to a function of the menu screen received through the menu screen and selected by a user,
wherein the menu screen generator generates the menu screen based on the screen state information including at least one of screen state information of the image processing device, content information output to the display of the image processing device, real-time output state information of a content output to the display of the image processing device, screen split mode information of the image processing device, pan-tilt-zoom (PTZ) support information of a source terminal, audio output state information of the image processing device, time information, and recording state information.

15. The mobile terminal of claim 14, wherein the mobile terminal is paired with the image processing device by a Wi-Fi direct communication or a Bluetooth communication.

16. The mobile terminal of claim 14, wherein the image processing device receives at least one content from at least one source terminal capturing a monitoring image of a particular area, assigns a channel number for identifying the monitoring image to each of at least one monitoring image transmitted by the at least one source terminal, and receives a received image on a at least one of the at display of the image least one monitoring image and displaying processing device.

* * * * *